Sept. 27, 1927.  J. W. FRY  1,643,840
MULTIPLE SPRING
Filed June 30, 1926

John W. Fry
INVENTOR.
BY
ATTORNEY.

Patented Sept. 27, 1927.

1,643,840

UNITED STATES PATENT OFFICE.

JOHN W. FRY, OF STRUTHERS, OHIO.

MULTIPLE SPRING.

Application filed June 30, 1926. Serial No. 119,651.

This invention relates to vehicle springs, and has for its object the carrying of the vehicle body and its load with the least amount of friction. In order to do this, various combinations of springs and levers have been resorted to.

Another object of this invention is to provide vehicle springs which will tend to automatically carry the vehicle body or load with the minimum reaction which ordinarily results in jolts, rebounds, and side swings of the vehicle body or load when carried by ordinary springs. It has been the aim to so construct and install my improved springs so that the vehicle may be driven over rough or uneven roads without setting up motions or forces in the body or load of the vehicle body that will tend to check or retard the straight forward movement of the vehicle, thereby reducing strains and conserving of driving energy.

A furthur object of the invention is to provide a spring anchored on each side of the center of gravity of the body of the vehicle in combination with a plurality of graduated springs in order to absorb the shock or rebound caused by the vehicle traveling over rough or uneven roads.

A still further object of the invention is to provide multiple springs attached in such a manner that when the vehicle is empty, only one or more of the plurality of springs function and as the load on the vehicle is increased the use of the other multiple springs are automatically brought into use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figures 1, 2:
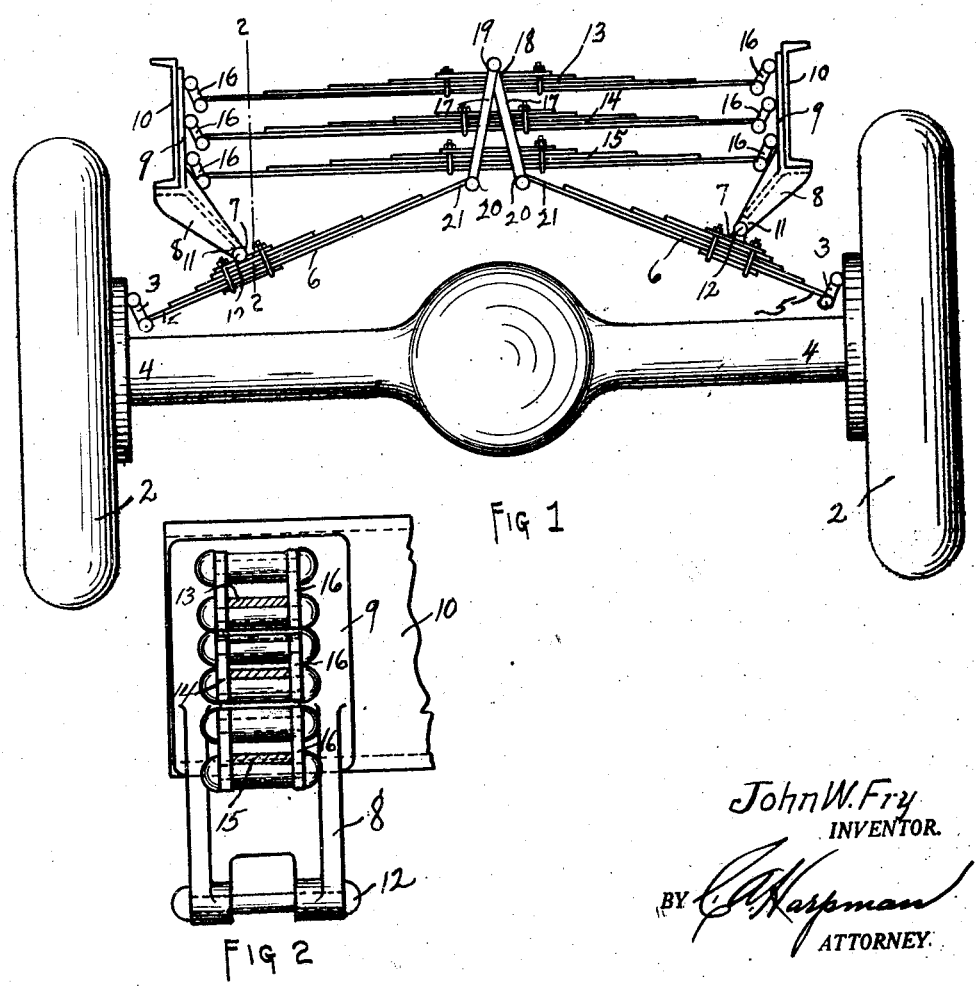
Figure 1 is a vertical elevation of the device.
Figure 2 is a cross section taken on line 2—2 of Fig. 1.

By referring to Figure 1 it will be seen that I have provided an axle 1, supported by wheels 2. It will be seen that I have provided shackles 3 supported by any ordinary means to the axle 1, the lower ends 4 connected to lower ends 5 of inclined springs 6. Positioned upon the upper surface of each of these inclined springs 6 at points 7, there is provided downwardly inturned supports 8. The upper portions 9 of these downwardly inturned supports 8 are secured to ordinary frame members 10 of a vehicle. It will be seen that the lower ends 11 of the downwardly inturned supports 8 are pivoted by means of pivot pins 12 to the upper surface of the inclined springs 6 at points 7. Arranged within the upper portions 9 of the downwardly inturned supports 8 there is provided a plurality of horizontal springs 13, 14, and 15. These horizontal springs 13, 14, and 15 are secured to the upper portions 9 of the downwardly inturned supports 8 by means of shackles 16. The upper spring 13 of the plurality of springs 13, 14, and 15 carries shackles 17, the upper ends 18 of these shackles 17 are secured at a central point 19 on the horizontal spring 13 of the plurality of springs 13, 14 and 15. The lower ends 20 of the shackles 17 are pivotally secured to the upper ends 21 of the inclined springs 6.

Many vehicles, especially trucks, make a great deal of mileage while empty. Passenger cars often carry varying loads. It is obvious that when the vehicle, be it truck or passenger car, is empty, the upper spring 13 of the plurality of horizontal springs 13, 14, and 15 will vibrate freely as the wheels 2 are subjected to uneven surfaces of the road, due to the functioning of the inclined springs 6 and their connections. When the vehicle is carrying a load, the horizontal spring 13 of the plurality of horizontal springs 13, 14, and 15 will be sprung down upon the spring 14, which in turn may be sprung down upon the horizontal spring 15, if the load is great enough. As springs are ordinarily constructed today, for motor vehicles especially, there is but one place in the range of load that will cause the springs to give fairly efficient spring service.

It is obvious that by means of my improved springs, varying loads may be carried, and at the same time getting good results from the springs. It is also obvious that a rolling or tilting motion from side to side is prevented due to the position of the inclined springs 6 when taken in relation with the downwardly inturned supports 8.

In order to construct and assemble my improved springs, it is evident that the downwardly inturned supports 8 may be formed so as to be pivoted by means of the pivot pins 12 on any point desired on the upper surface of the inclined springs 6. The point to which said downwardly inclined supports 8 functioning with the inclined springs 6 depending upon the flexibility of these inclined springs 6. If desired these inclined springs 6 may be constructed so sturdily that they may practically amount to levers when taken in consideration with the flexibility of the plurality of horizontal springs 13, 14, and 15.

In the functioning of my improved springs it is obvious that the load is sustained by means of a three point suspension by means of the two inclined springs 6, the two lower ends 5 functioning with the shackles 3. The upper ends 21 of the inclined springs 6 functioning with the shackles 17 thereby causing a downward pull from a central portion of the horizontal spring 13. It is obvious that by using this construction there is produced a stabilizing and balancing action when considering the load of the vehicle when carried over uneven roads where one wheel or the other may be subjected to a depression in the road or a bump or sharp elevation in the road.

What I claim is:—

1. In a device of the class described, two inclined springs the lower ends of which are supported by means of shackles attached to an ordinary axle, downwardly inturned supports supporting a frame of a vehicle and pivotally mounted upon an upper surface of said inclined springs, a plurality of horizontal springs spaced apart and shackled between said frame, two shackles pivotally secured to the upper horizontal spring at a central point, lower ends of said shackles pivotally secured to upper ends of said inclined springs for the purpose of allowing for vibration of said upper horizontal spring or for the purpose of bending the upper horizontal spring so as to come in contact with a lower spring and this lower spring in contact with a still lower spring when carrying a heavy load.

2. In a vehicle spring the combination of two inclined springs, outer lower ends of said inclined springs pivotally attached to an axle, two downwardly inturned supports for the purpose of supporting a vehicle frame, a plurality of horizontal springs spaced apart, means for securing an upper horizontal spring to the upper end of said inclined springs for the purpose of providing an automatic means of utilizing one or more of said horizontal springs depending upon the load carried.

3. In a device of the class described, two levers, attaching means for attaching the two levers to outer ends of an axle, inner ends functioning with shackles, a plurality of horizontal springs, the upper ends of said shackles secured to a central point of said horizontal springs, two downwardly inturned supports functioning with a frame of a vehicle and pivoted upon an upper surface of each of the two levers above mentioned.

4. In a device of the class described, a plurality of horizontal springs, shackles connected to a central point on uppermost horizontal spring, two springs positioned underneath said horizontal springs, outer ends of each horizontal spring secured near outer end of an axle, inner ends of said springs secured to lower ends of said shackles, fulcrums or supporting means functioning with a frame portion of vehicle and pivoted upon the upper surface of each of said springs which have their inner ends attached to said shackles substantially as described for the purpose set forth.

In testimony whereof I affix my signature.

JOHN W. FRY.